(12) United States Patent
Wrinkle (10) Patent No.: US 10,477,761 B1
(45) Date of Patent: Nov. 19, 2019

(54) ADJUSTABLE WEEDEATER HANDLE

(71) Applicant: Ripling Wrinkle, Leaksville, MS (US)

(72) Inventor: Ripling Wrinkle, Leaksville, MS (US)

( * ) Notice: Subject to any disclaimer, the term of this patent is extended or adjusted under 35 U.S.C. 154(b) by 0 days.

(21) Appl. No.: 16/242,176

(22) Filed: Jan. 8, 2019

(51) Int. Cl.
*A01D 34/90* (2006.01)

(52) U.S. Cl.
CPC ......... *A01D 34/902* (2013.01); *Y10T 16/4713* (2015.01)

(58) Field of Classification Search
CPC . Y10T 16/4713; Y10T 16/476; Y10T 16/515; A01D 34/902; B25G 1/06; B25G 3/38; A01B 1/026
USPC ...... 16/426, 430, 445; 30/275.4, 276, 296.1; 294/58; 15/144.1
See application file for complete search history.

(56) References Cited

U.S. PATENT DOCUMENTS

| | | | | |
|---|---|---|---|---|
| 2,536,607 A * | 1/1951 | Jenkins | ..................... | A01D 7/02 15/144.4 |
| 3,751,094 A * | 8/1973 | Bohler | ................... | A01B 1/026 294/58 |
| 4,452,131 A * | 6/1984 | Gaskins | .............. | A47J 37/0694 16/426 |
| 5,054,830 A * | 10/1991 | Nisenbaum | .............. | B25G 1/00 16/426 |
| 5,400,471 A * | 3/1995 | Lichfield | .................. | B25G 1/00 16/426 |
| 5,496,085 A * | 3/1996 | Middleton | ............. | A01B 1/026 16/426 |
| 5,669,101 A * | 9/1997 | Aiyama | .................. | A01D 34/90 16/426 |
| 6,421,868 B1 * | 7/2002 | Tran | ..................... | A47L 11/4061 15/49.1 |
| 7,300,081 B1 * | 11/2007 | Murray | ..................... | B25G 1/02 16/426 |
| 8,418,321 B1 * | 4/2013 | Heiman | ................... | B25G 1/06 15/143.1 |
| 2003/0074765 A1 * | 4/2003 | Quimby | ................... | A01B 1/00 16/426 |
| 2007/0068008 A1 * | 3/2007 | Wu | ....................... | A01D 34/416 30/276 |
| 2008/0168625 A1 * | 7/2008 | Peach | ....................... | B62B 1/18 16/426 |
| 2010/0064480 A1 * | 3/2010 | Martin | .................... | B25F 5/026 16/426 |
| 2013/0186051 A1 * | 7/2013 | Ran | ......................... | A01D 34/84 56/16.9 |
| 2015/0083452 A1 * | 3/2015 | Rader | .................. | A01D 34/902 173/170 |
| 2015/0313079 A1 * | 11/2015 | Wang | .................. | A01D 34/824 30/275.4 |

* cited by examiner

*Primary Examiner* — William L Miller
(74) *Attorney, Agent, or Firm* — Kyle A. Fletcher, Esq.

(57) ABSTRACT

The adjustable weedeater handle is an over-sized grasping point for a weedeater. The adjustable weedeater handle may be attached to the weedeater by coupling a mount to the shaft of the weedeater such that the proximal handle section extends towards the trimmer motor and the distal handle section extends towards the trimmer head. The distal handle section and/or the proximal handle section may be independently pivoted to desired and comfortable positions. The weedeater may be held by placing the hands on the shaft of the weedeater, on the distal handle section, on the proximal handle section, or combinations thereof.

18 Claims, 5 Drawing Sheets

ADJUSTABLE WEEDEATER HANDLE

CROSS REFERENCES TO RELATED APPLICATIONS

This application claims the benefit of priority to the provisional patent application 62/466,959 that was filed by the applicant on Mar. 3, 2017.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of lawn tools, more specifically, a adjustable weedeater handle.

SUMMARY OF INVENTION

The adjustable weedeater handle is an over-sized grasping point for a weedeater. The adjustable weedeater handle may be attached to the weedeater by coupling a mount to the shaft of the weedeater such that the proximal handle section extends towards the trimmer motor and the distal handle section extends towards the trimmer head. The distal handle section and/or the proximal handle section may be independently pivoted to desired and comfortable positions. The weedeater may be held by placing the hands on the shaft of the weedeater, on the distal handle section, on the proximal handle section, or combinations thereof.

An object of the invention is to provide a handle for a weed trimmer that is larger than the handle provided with the original equipment.

Another object of the invention is to provide a proximal handle section that extends towards the top of the weed trimmer and a distal handle section that extends towards the bottom of the weed trimmer.

A further object of the invention is to allow the proximal handle section and the distal handle section to pivot independently of each other.

Yet another object of the invention is to couple the invention to the shaft of the weed trimmer using a clamp or a clip.

These together with additional objects, features and advantages of the adjustable weedeater handle will be readily apparent to those of ordinary skill in the art upon reading the following detailed description of the presently preferred, but nonetheless illustrative, embodiments when taken in conjunction with the accompanying drawings.

In this respect, before explaining the current embodiments of the adjustable weedeater handle in detail, it is to be understood that the adjustable weedeater handle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the adjustable weedeater handle.

It is therefore important that the claims be regarded as including such equivalent construction insofar as they do not depart from the spirit and scope of the adjustable weedeater handle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 6.

The adjustable weedeater handle 100 (hereinafter invention) comprises a The adjustable weedeater handle 100 (hereinafter invention) comprises a distal handle section 200, a proximal handle section 230, and a mount 260. The invention 100 is a grasping point for a weedeater 900. The distal handle section 200 and the proximal handle section 230 may be hingedly adjustable relative to each other to provide a plurality of comfort adjustments.

The distal handle section 200 comprises a first distal side bar 202, a second distal side bar 204, a distal outer grip bar 206, a distal inner grip bar 208, a first distal hinge arm 210, a second distal hinge arm 212, and a plurality of distal corners 214. The distal handle section 200 may be a rectangular frame handle for grasping and holding the weedeater 900.

The first distal side bar 202 and the second distal side bar 204 may be oriented to be parallel to each other. The first distal side bar 202 and the second distal side bar 204 may be separated from each other at a first end of the distal handle section 216 by the distal outer grip bar 206. The first distal side bar 202 and the second distal side bar 204 may be separated from each at their centers by the distal inner grip bar 208. The first distal hinge arm 210 may be coupled to the first distal side bar 202 at a second end of the distal handle section 218. The second distal hinge arm 212 may be coupled to the second distal side bar 204 at the second end of the distal handle section 218. The first distal hinge arm 210 and the second distal hinge arm 212 may be pivotably coupled to the mount 260. The distal handle section 200 may pivot at the second end of the distal handle section 218 by having the first distal hinge arm 210 and the second distal hinge arm 212 rotate around the mount 260.

The distal outer grip bar 206 may be oriented to be perpendicular to the first distal side bar 202 and perpendicular to the second distal side bar 204. The distal outer grip bar 206 may be oriented to be parallel to the distal inner grip bar 208. The first distal hinge arm 210 may be oriented to be perpendicular to the first distal side bar 202. The second distal hinge arm 212 may be oriented to be perpendicular to the second distal side bar 204. The plurality of distal corners 214 may couple each end of the first distal side bar 202 to the distal outer grip bar 206 and the first distal hinge arm 210. The plurality of distal corners 214 may couple each end of the second distal side bar 204 to the distal outer grip bar 206 and the second distal hinge arm 212.

The proximal handle section 230 comprises a first proximal side bar 232, a second proximal side bar 234, a proximal outer grip bar 236, a proximal inner grip bar 238, a first proximal hinge arm 240, a second proximal hinge arm 242, and a plurality of proximal corners 244. The proximal handle section 230 may be a rectangular frame handle for grasping and holding the weedeater 900.

The first proximal side bar 232 and the second proximal side bar 234 may be oriented to be parallel to each other. The first proximal side bar 232 and the second proximal side bar 234 may be separated from each other at a first end of the proximal handle section 246 by the proximal outer grip bar 236. The first proximal side bar 232 and the second proximal side bar 234 may be separated from each at their centers by the proximal inner grip bar 238. The first proximal hinge arm 240 may be coupled to the first proximal side bar 232 at a second end of the proximal handle section 248. The second proximal hinge arm 242 may be coupled to the second proximal side bar 234 at the second end of the proximal handle section 248. The first proximal hinge arm 240 and the second proximal hinge arm 242 may be pivotably coupled to the mount 260. The proximal handle section 230 may pivot at the second end of the proximal handle section 248 by having the first proximal hinge arm 240 and the second proximal hinge arm 242 rotate around the mount 260.

The proximal outer grip bar 236 may be oriented to be perpendicular to the first proximal side bar 232 and perpendicular to the second proximal side bar 234. The proximal outer grip bar 236 may be oriented to be parallel to the proximal inner grip bar 238. The first proximal hinge arm 240 may be oriented to be perpendicular to the first proximal side bar 232. The second proximal hinge arm 242 may be oriented to be perpendicular to the second proximal side bar 234. The plurality of proximal corners 244 may couple each end of the first proximal side bar 232 to the proximal outer grip bar 236 and the first proximal hinge arm 240. The plurality of proximal corners 244 may couple each end of the second proximal side bar 234 to the proximal outer grip bar 236 and the second proximal hinge arm 242.

The distal handle section 200 and the proximal handle section 230 may be unequal lateral widths. The distal handle section 200 and the proximal handle section 230 may be unequal longitudinal lengths.

The distal handle section 200 and the proximal handle section 230 may pivot independently of each other. As a non-limiting example, the distal handle section 200 may be held in place after it has been pivoted due to a friction fit between the first distal hinge arm 210 and a distal hinge 280 and/or a friction fit between the second distal hinge arm 212 and the distal hinge 280. The proximal handle section 230 may be held in place after it has been pivoted due to a friction fit between the first proximal hinge arm 240 and a proximal hinge 285 and/or a friction fit between the second proximal hinge arm 242 and the proximal hinge 285. In some embodiments, the distal handle section 200 and the proximal handle section 230 may be held in their pivoted positions by a plurality of detents located within their respective hinge joints The mount 260 comprises a shaft bracket 265, a hinge spacer 275, the distal hinge 280, and the proximal hinge 285. The mount 260 may couple to a shaft 915 of the weedeater 900. The proximal handle section 230 may be pivotably coupled to the mount 260 such that the proximal handle section 230 is located on the top side of the mount 260 closer to a trimmer motor 905. The distal handle section 200 may be pivotably coupled to the mount 260 such that the distal handle section 200 is located on the bottom side of the mount 260 closer to a trimmer head 910.

The shaft bracket 265 may couple to the shaft 915 of the weedeater 900. The top of the shaft bracket 265 may couple to the hinge spacer 275, either directly or via a riser that separates the shaft 915 of the weedeater 900 from the hinge spacer 275.

Figure 1:
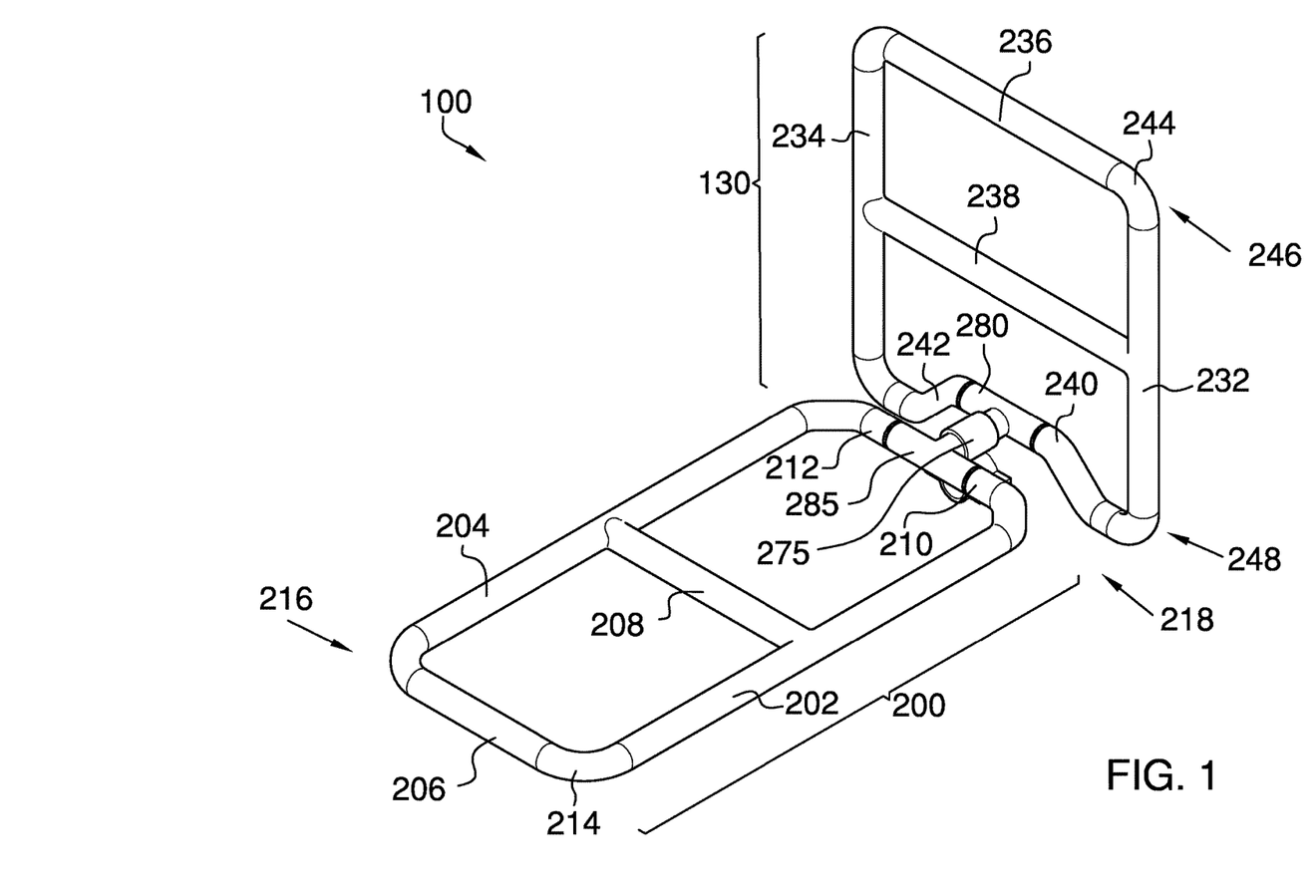
FIG. 1 is a perspective view of an embodiment of the disclosure.
Figure 2:
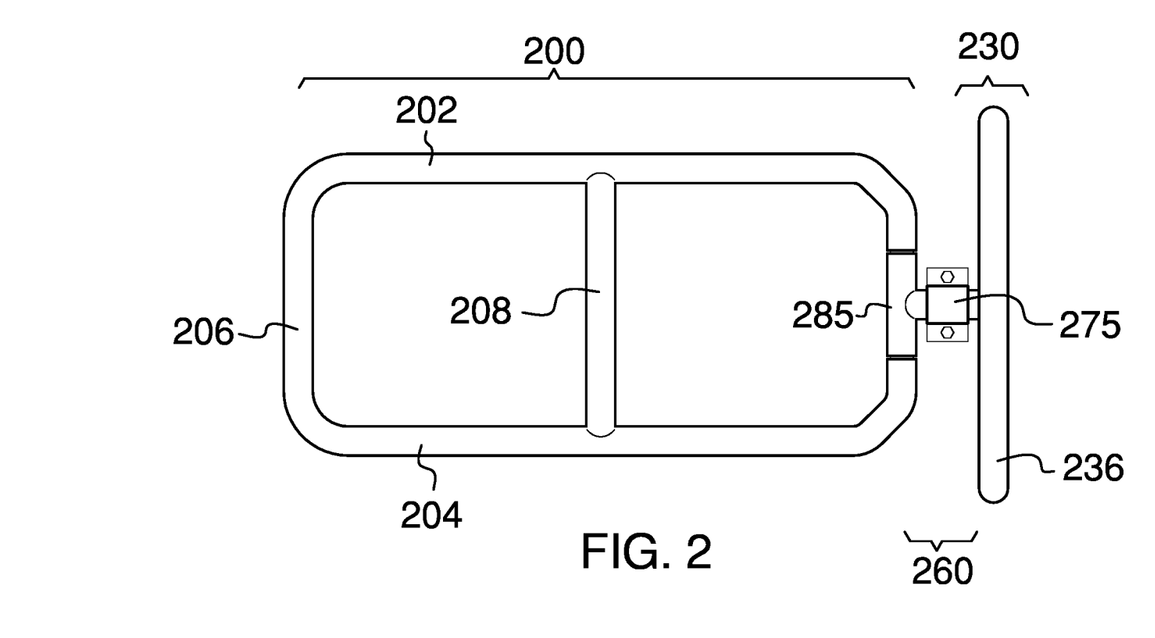
FIG. 2 is a top view of an embodiment of the disclosure.
Figure 3:
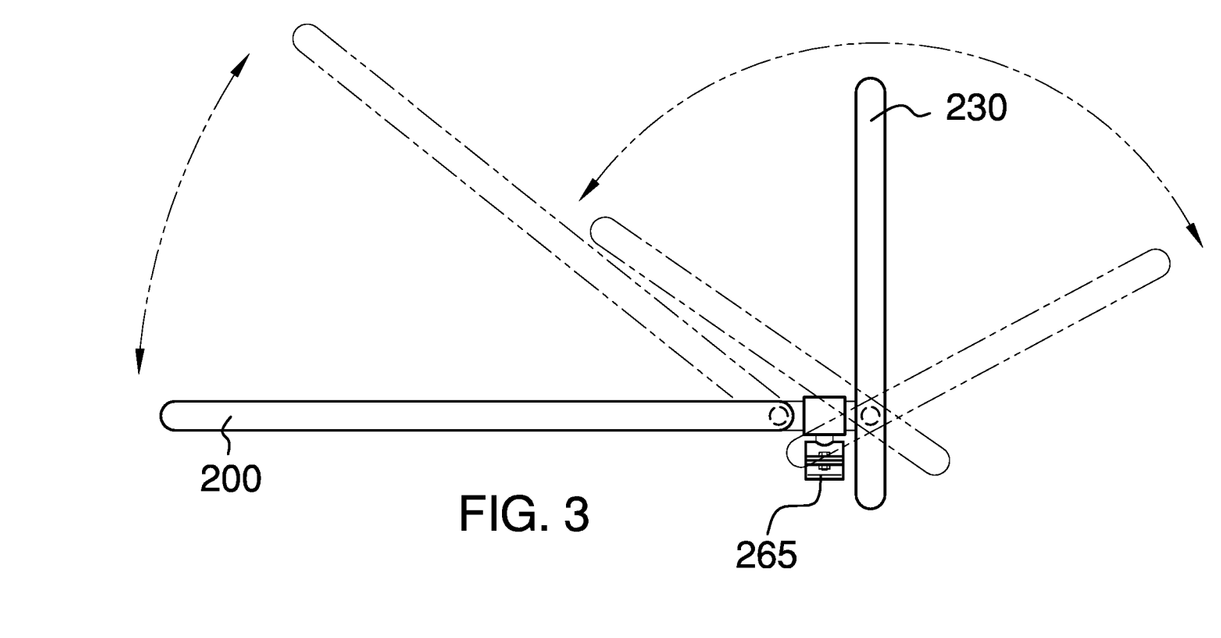
FIG. 3 is a side view of an embodiment of the disclosure illustrating the pivoting capability of the proximal handle section and the distal handle section.
Figure 4:
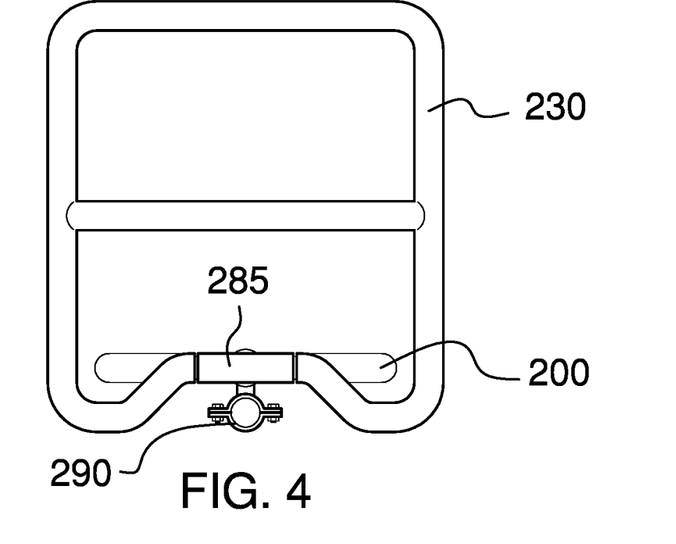
FIG. 4 is a rear view of an embodiment of the disclosure illustrating a clamp mount.

In some embodiments, the shaft bracket 265 may be a clamp 290 as shown in FIG. 4. The clamp 290 may comprise two or more armatures that couple to each other to surround the shaft 915 of the weedeater 900.

Figure 5:
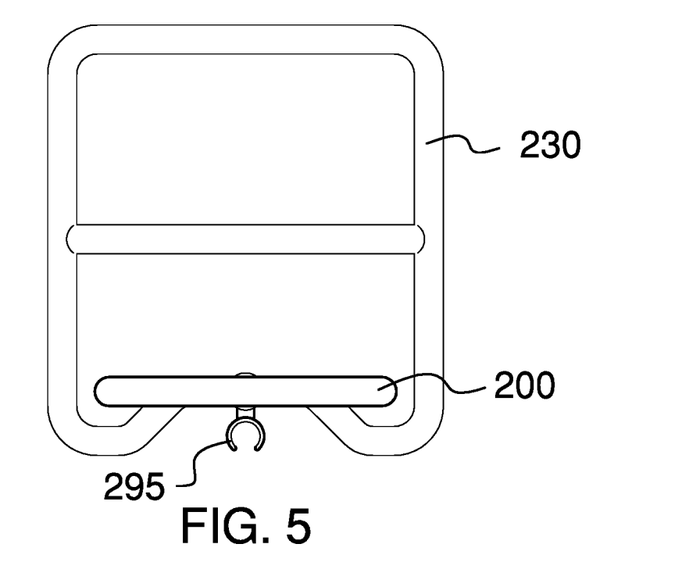
FIG. 5 is a front view of an embodiment of the disclosure illustrating a clip mount.
Figure 6:
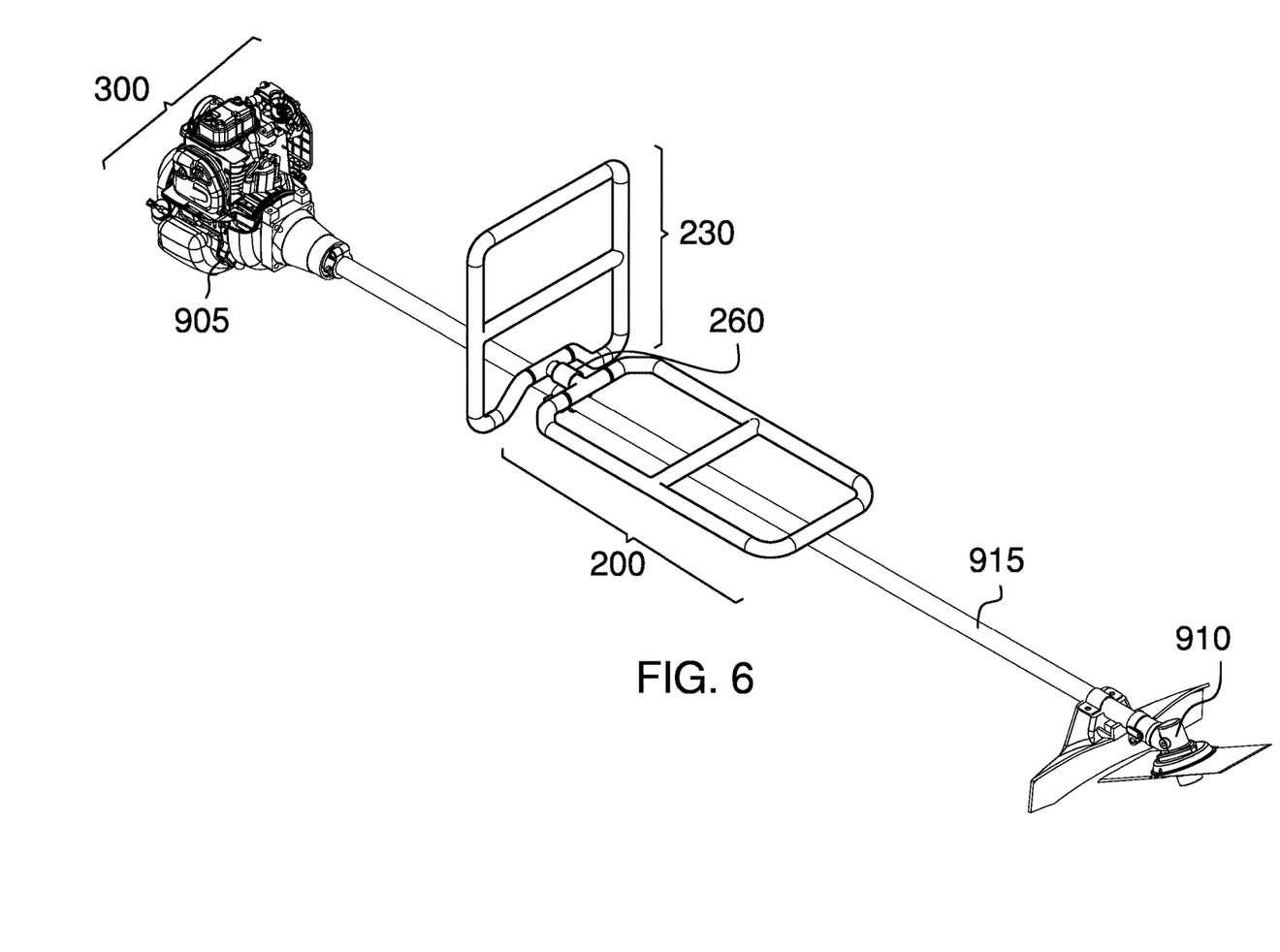
FIG. 6 is an in-use view of an embodiment of the disclosure.

In some embodiments, the shaft bracket 265 may be a clip 295 as shown in FIG. 5. The clip 295 may comprise a C-shaped armature that flexes open to be installed onto or removed from the shaft 915 of the weedeater 900 and flexes closed to retain its grip on the shaft 915.

The hinge spacer 275 may comprise an armature that separates the proximal hinge 285 from the distal hinge 280. The hinge spacer 275 may be oriented such that the hinge spacer 275 is parallel to the shaft 915 of the weedeater 900.

The distal hinge 280 may be a round armature located on lower end of the hinge spacer 275. The first distal hinge arm 210 and the second distal hinge arm 212 may rotationally couple to the distal hinge 280 such that the distal handle section 200 may pivot around the distal hinge 280.

The proximal hinge 285 may be a round armature located on upper end of the hinge spacer 275. The first proximal hinge arm 240 and the second proximal hinge arm 242 may rotationally couple to the proximal hinge 285 such that the proximal handle section 230 may pivot around the proximal hinge 285.

In use, the invention 100 is attached to the weedeater 900 by coupling the mount 260 to the shaft 915 of the weedeater 900 such that the proximal handle section 230 extends up towards the trimmer motor 905 and the distal handle section 200 extends down towards the trimmer head 910. The distal handle section 200 and/or the proximal handle section 230 may be pivoted to desired and comfortable positions. The weedeater 900 may be held by placing one hand on the shaft 915 of the weedeater 900 and the other hand on the distal handle section 200 or the proximal handle section 230. The weedeater 900 may also be held by placing one hand on the distal handle section 200 and the other hand on the proximal handle section 230.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, a "clip" is a fastener that attaches to an object by gripping or clasping the object. A clip is typically spring loaded.

As used herein, the words "couple", "couples", "coupled" or "coupling", refer to connecting, either directly or indirectly, and does not necessarily imply a mechanical connection.

As used herein, the word "desired" refers to a specific value or action within a range of supported values or action. A "desired" value or action indicates that a range of values or actions is enabled by the invention and that a user of the invention may select a specific value or action within the supported range of values or action based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, the terms "distal" and "proximal" may be used to describe relative positions. Distal refers to the object, or the end of an object, that is situated away from the point of origin, point of reference, or point of attachment. Proximal refers to the object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point or a central axis of an object and the direction of comparison may be in a radial or lateral direction.

As used herein, the term "friction fit" refers to a type of mechanical coupling where a first component presses into a second component and is held there only by the friction of the first component against the second component. A friction fit may also be known as an interference fit or a press fit.

As used in this disclosure, a "handle" is an object by which a tool, object, or door is held or manipulated with the hand.

As used in this disclosure, a "hinge" is a device that permits the turning, rotating, or pivoting of a first object relative to a second object.

As used in this disclosure, the word "lateral" refers to the sides of an object or movement towards a side. Lateral directions are generally perpendicular to longitudinal directions. "Laterally" refers to movement in a lateral direction.

As used herein, the word "longitudinal" or "longitudinally" refers to a lengthwise or longest direction.

As used in this disclosure, a "motor" refers to a device that transforms energy from an external power source into mechanical energy.

As used in this disclosure, the term "shaft" is used to describe a rigid cylinder that is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An adjustable weedeater handle comprising:
a distal handle section, a proximal handle section, and a mount;
wherein the adjustable weedeater handle is a grasping point for a weedeater;
wherein the distal handle section and the proximal handle section are hingedly adjustable relative to each other to provide a plurality of comfort adjustments;
wherein the distal handle section comprises a first distal side bar, a second distal side bar, a distal outer grip bar, a distal inner grip bar, a first distal hinge arm, a second distal hinge arm, and a plurality of distal corners;
wherein the distal handle section is a rectangular frame handle for grasping and holding the weedeater.

2. The adjustable weedeater handle according to claim 1 wherein the first distal side bar and the second distal side bar are oriented to be parallel to each other;
wherein the first distal side bar and the second distal side bar are separated from each other at a first end of the distal handle section by the distal outer grip bar;
wherein the first distal side bar and the second distal side bar are separated from each at their centers by the distal inner grip bar;
wherein the first distal hinge arm is coupled to the first distal side bar at a second end of the distal handle section;
wherein the second distal hinge arm is coupled to the second distal side bar at the second end of the distal handle section;
wherein the first distal hinge arm and the second distal hinge arm are pivotably coupled to the mount;
wherein the distal handle section pivots at the second end of the distal handle section by having the first distal hinge arm and the second distal hinge arm rotate around the mount.

3. The adjustable weedeater handle according to claim 2
wherein the distal outer grip bar is oriented to be perpendicular to the first distal side bar and perpendicular to the second distal side bar;
wherein the distal outer grip bar is oriented to be parallel to the distal inner grip bar;
wherein the first distal hinge arm is oriented to be perpendicular to the first distal side bar;
wherein the second distal hinge arm is oriented to be perpendicular to the second distal side bar;
wherein the plurality of distal corners couple each end of the first distal side bar to the distal outer grip bar and the first distal hinge arm;
wherein the plurality of distal corners couple each end of the second distal side bar to the distal outer grip bar and the second distal hinge arm.

4. The adjustable weedeater handle according to claim 3
wherein the proximal handle section comprises a first proximal side bar, a second proximal side bar, a proximal outer grip bar, a proximal inner grip bar, a first proximal hinge arm, a second proximal hinge arm, and a plurality of proximal corners;
wherein the proximal handle section is a rectangular frame handle for grasping and holding the weedeater.

5. The adjustable weedeater handle according to claim 4
wherein the first proximal side bar and the second proximal side bar are oriented to be parallel to each other;
wherein the first proximal side bar and the second proximal side bar are separated from each other at a first end of the proximal handle section by the proximal outer grip bar;
wherein the first proximal side bar and the second proximal side bar are separated from each at their centers by the proximal inner grip bar;
wherein the first proximal hinge arm is coupled to the first proximal side bar at a second end of the proximal handle section;
wherein the second proximal hinge arm is coupled to the second proximal side bar at the second end of the proximal handle section;
wherein the first proximal hinge arm and the second proximal hinge arm are pivotably coupled to the mount;
wherein the proximal handle section pivots at the second end of the proximal handle section by having the first proximal hinge arm and the second proximal hinge arm rotate around the mount.

6. The adjustable weedeater handle according to claim 5
wherein the proximal outer grip bar is oriented to be perpendicular to the first proximal side bar and perpendicular to the second proximal side bar;
wherein the proximal outer grip bar is oriented to be parallel to the proximal inner grip bar;
wherein the first proximal hinge arm is oriented to be perpendicular to the first proximal side bar;
wherein the second proximal hinge arm is oriented to be perpendicular to the second proximal side bar;
wherein the plurality of proximal corners couple each end of the first proximal side bar to the proximal outer grip bar and the first proximal hinge arm;
wherein the plurality of proximal corners couple each end of the second proximal side bar to the proximal outer grip bar and the second proximal hinge arm.

7. The adjustable weedeater handle according to claim 6
wherein the distal handle section and the proximal handle section are unequal lateral widths.

8. The adjustable weedeater handle according to claim 6
wherein the distal handle section and the proximal handle section are unequal longitudinal lengths.

9. The adjustable weedeater handle according to claim 6
wherein the distal handle section and the proximal handle section pivot independently of each other.

10. The adjustable weedeater handle according to claim 9
wherein the distal handle section is held in place after it has been pivoted due to a friction fit between the first distal hinge arm and a distal hinge and/or a friction fit between the second distal hinge arm and the distal hinge;
wherein the proximal handle section is held in place after it has been pivoted due to a friction fit between the first proximal hinge arm and a proximal hinge and/or a friction fit between the second proximal hinge arm and the proximal hinge.

11. The adjustable weedeater handle according to claim 9
wherein the distal handle section and the proximal handle section are held in their pivoted positions by a plurality of detents located within their respective hinge joints.

12. The adjustable weedeater handle according to claim 9
wherein the mount comprises a shaft bracket, a hinge spacer, the distal hinge, and the proximal hinge;
wherein the mount couples to a shaft of the weedeater;
wherein the proximal handle section is pivotably coupled to the mount such that the proximal handle section is located on the top side of the mount closer to a trimmer motor;
wherein the distal handle section is pivotably coupled to the mount such that the distal handle section is located on the bottom side of the mount closer to a trimmer head.

13. The adjustable weedeater handle according to claim 12
wherein the shaft bracket couples to the shaft of the weedeater;
wherein the top of the shaft bracket couples to the hinge spacer, either directly or via a riser that separates the shaft of the weedeater from the hinge spacer.

14. The adjustable weedeater handle according to claim 13
wherein the shaft bracket is a clamp;
wherein the clamp comprises two or more armatures that couple to each other to surround the shaft of the weedeater.

15. The adjustable weedeater handle according to claim 13
wherein the shaft bracket is a clip;
wherein the clip comprises a C-shaped armature that flexes open to be installed onto or removed from the shaft of the weedeater and flexes closed to retain its grip on the shaft.

16. The adjustable weedeater handle according to claim 13
wherein the hinge spacer comprises an armature that separates the proximal hinge from the distal hinge;
wherein the hinge spacer is oriented such that the hinge spacer is parallel to the shaft of the weedeater.

17. The adjustable weedeater handle according to claim 16
wherein the distal hinge is a round armature located on lower end of the hinge spacer;
wherein the first distal hinge arm and the second distal hinge arm rotationally couple to the distal hinge such that the distal handle section pivots around the distal hinge.

18. The adjustable weedeater handle according to claim 17
  wherein the proximal hinge is a round armature located on upper end of the hinge spacer;
  wherein the first proximal hinge arm and the second proximal hinge arm rotationally couple to the proximal hinge such that the proximal handle section pivots around the proximal hinge.

* * * * *